A. T. PRESCOTT.
FERRY LANDING MACHINERY.
APPLICATION FILED SEPT. 29, 1909.
986,312.
Patented Mar. 7, 1911.
5 SHEETS—SHEET 3.
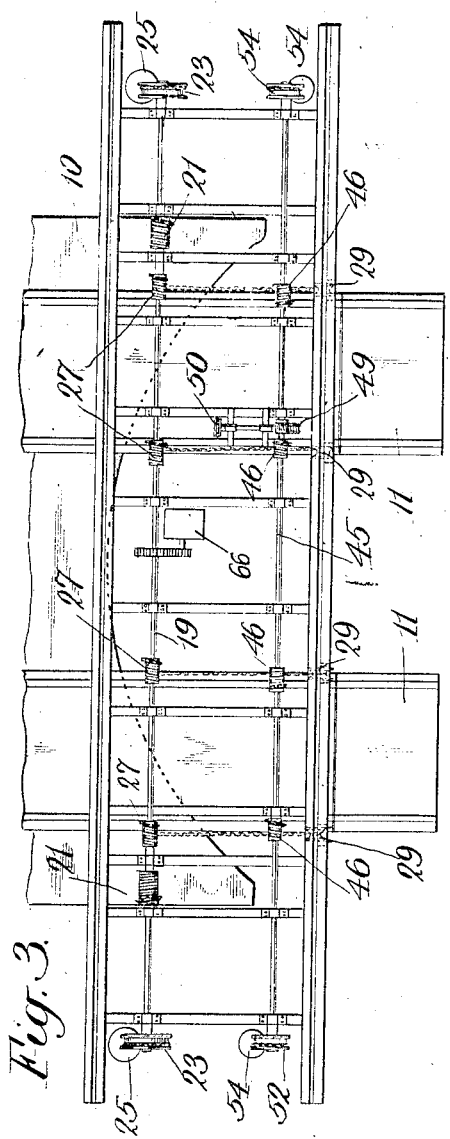
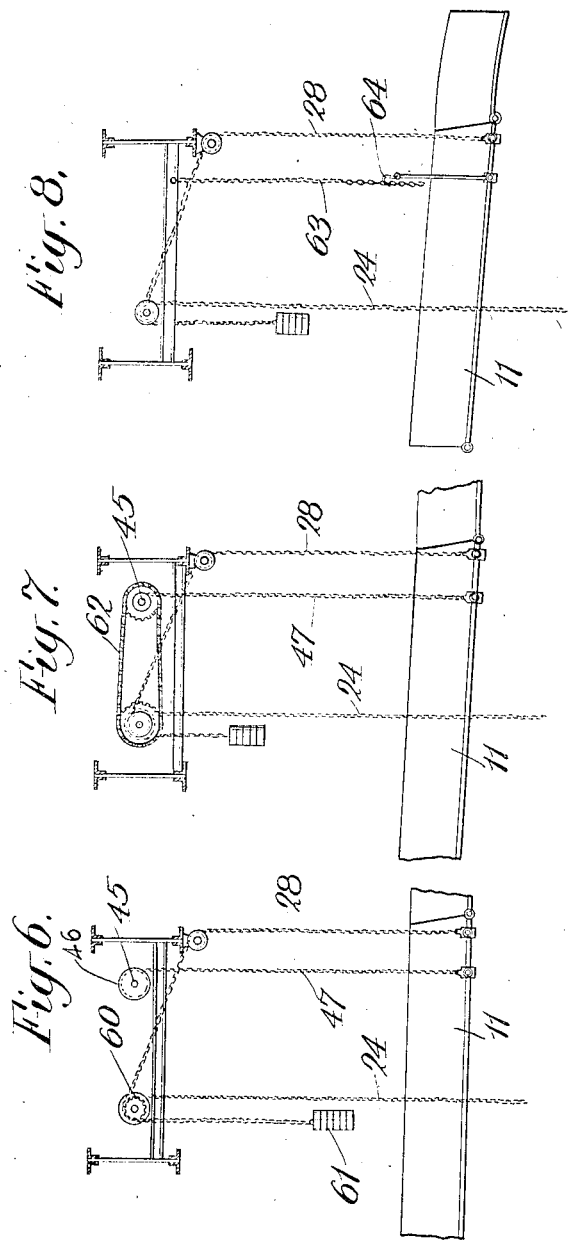
WITNESSES:
INVENTOR
Arthur T. Prescott
BY
his ATTORNEYS

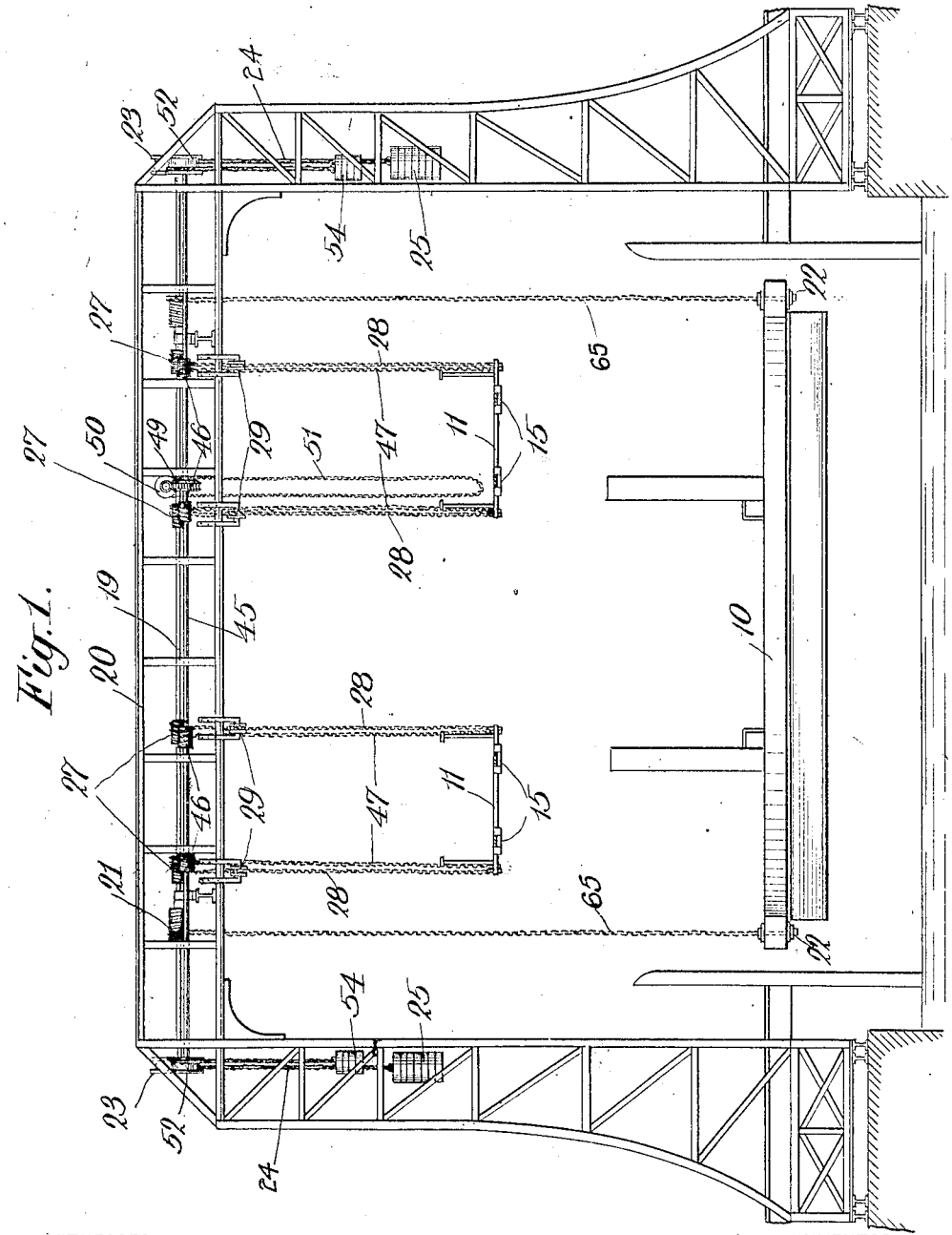

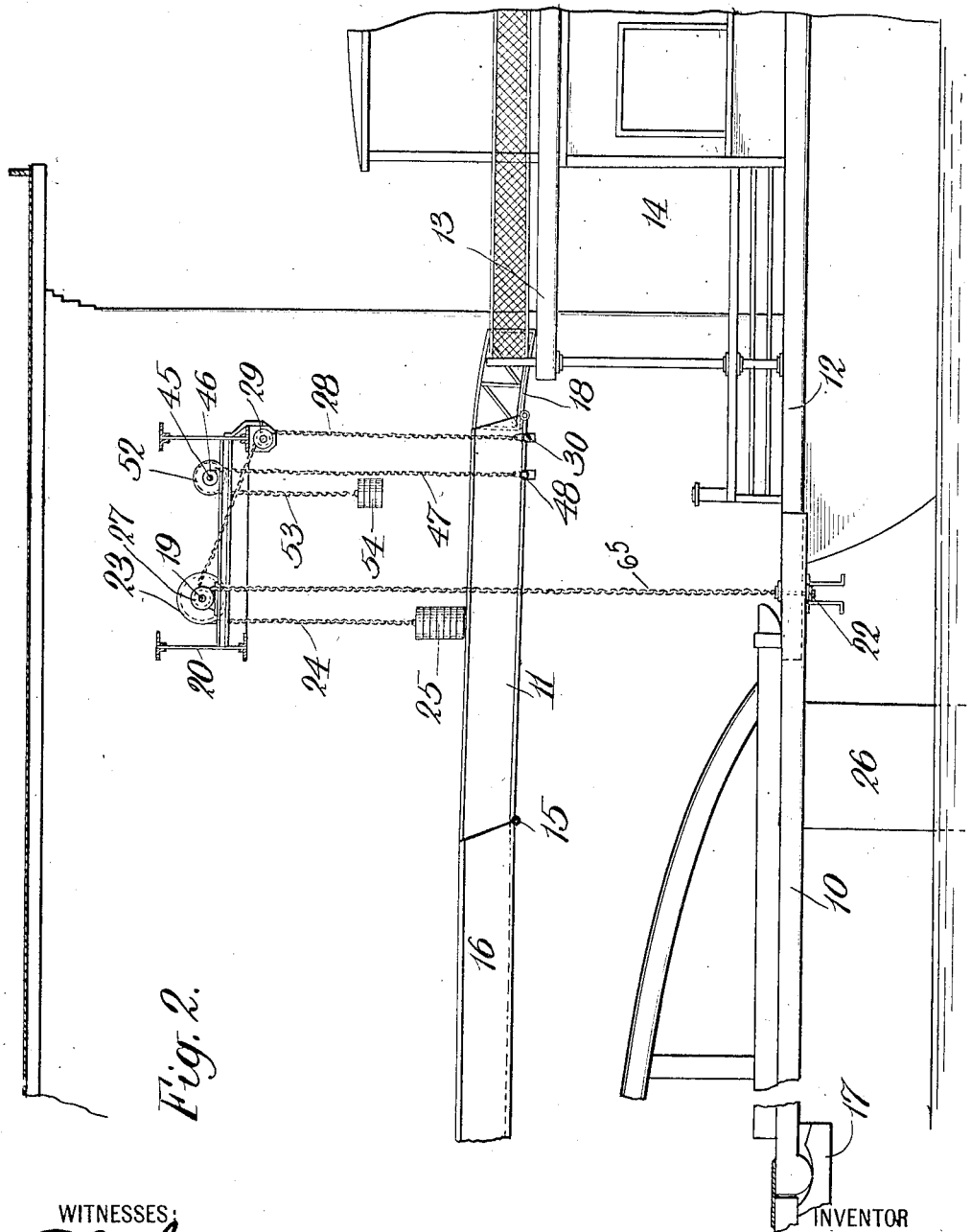

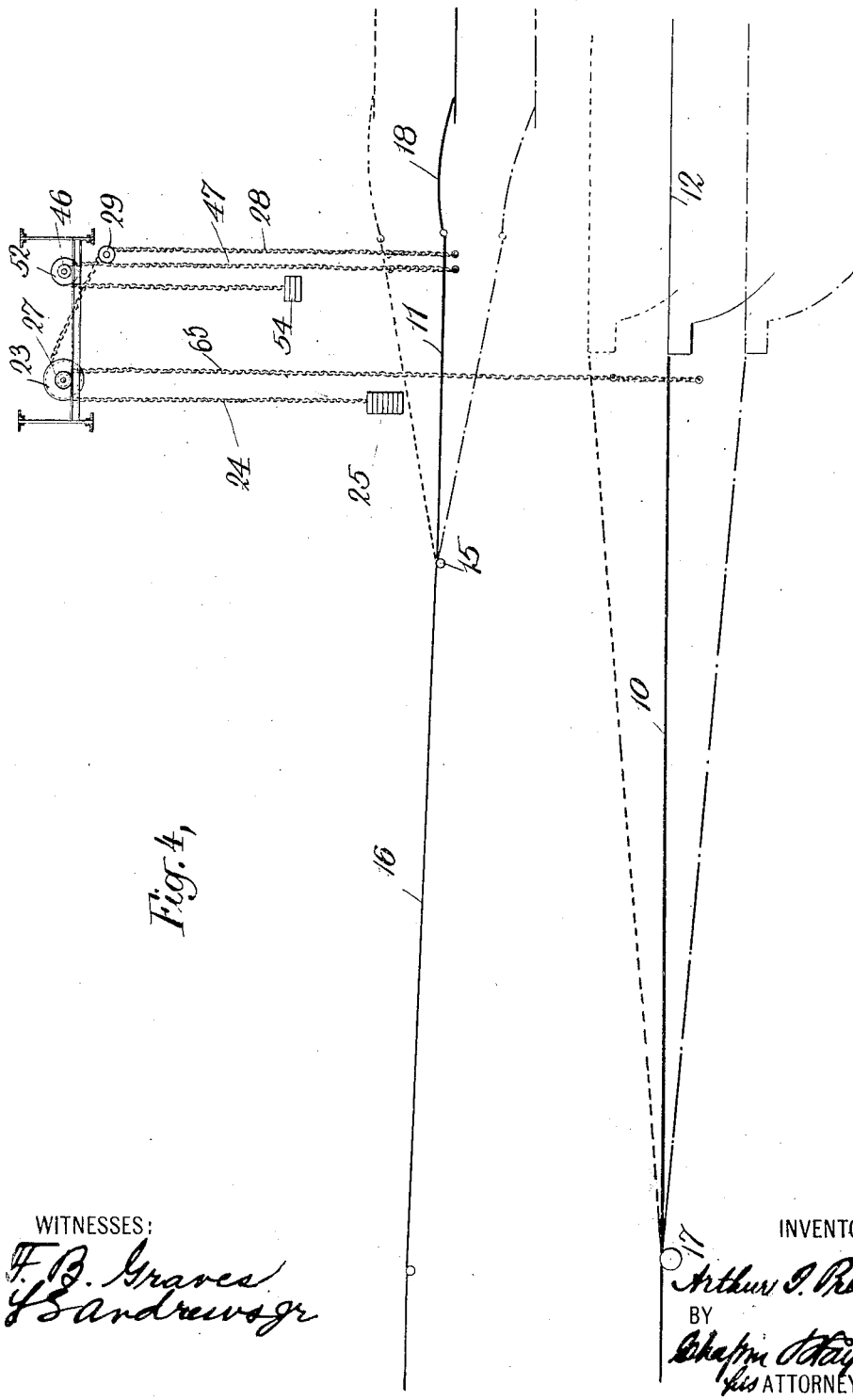

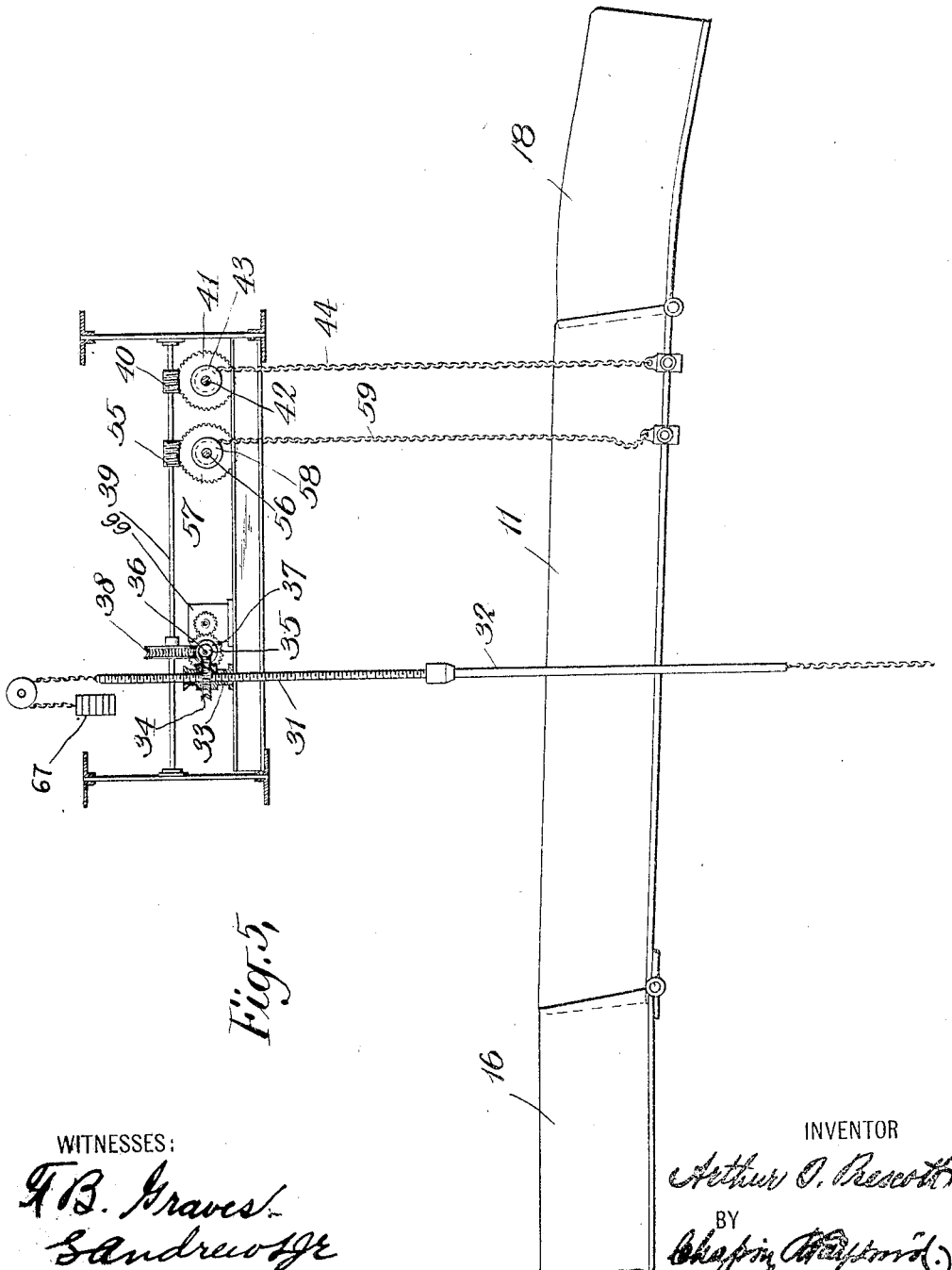

UNITED STATES PATENT OFFICE.

ARTHUR T. PRESCOTT, OF EAST ORANGE, NEW JERSEY, ASSIGNOR TO GEORGE H. FROTHINGHAM CO., A CORPORATION OF NEW YORK.

FERRY-LANDING MACHINERY.

986,312.  Specification of Letters Patent.  Patented Mar. 7, 1911.

Application filed September 29, 1909. Serial No. 520,075.

*To all whom it may concern:*

Be it known that I, ARTHUR T. PRESCOTT, a citizen of the United States of America, and a resident of East Orange, county of Essex, and State of New Jersey, have invented certain new and useful Improvements in Ferry-Landing Machinery, of which the following is a specification, reference being had to the accompanying drawings, forming a part thereof.

My invention relates to ferry landing machinery, and particularly to operating means for the upper gangways of double-decked ferry landings.

The lower bridge of a ferry landing, usually of very considerable length and weight, is generally pivoted at a considerable distance from its water end, and travels up and down as the tide rises and falls, or as the varying heights of the different boats make necessary. This movement is effected sometimes by means of a pontoon floating in the water under the bridge, and sometimes by means of overhead chains or screws, supported in a gallows frame, and raised or lowered by means of counterweights or by hand, or by electric power, or by a combination of these means. It is common practice to place over this main bridge one or more gangways to connect with the upper deck of the ferryboat. These gangways are usually much lighter and shorter than the lower bridge, and are commonly provided with an apron pivoted to the outer end, and which makes the final connection to the boat. On account of this apron the upper gangway itself does not generally rest upon the boat when in use, but is supported entirely by chains or rods to the gallows frame. From the employment of this apron, and because also of the shorter length of the upper gangways, the suspension point may not move as fast or as far as the suspension point of the lower or main bridge; and one of the objects of this invention is to provide a simple, inexpensive, and practical means for insuring a proper proportionate movement between the main landing bridge and the upper gangways. I attain this object by connecting the main bridge and the upper gangways by suitable suspension means with the same operating shaft, through drums, gearing, or the like, properly proportioned to impart the required relative speeds of movement.

My invention also consists in many novel features of construction and combinations of parts such as will be fully pointed out hereinafter.

In order that my invention may be clearly understood, I will now proceed to describe certain embodiments thereof which are illustrated in the accompanying drawings, and will then point out the novel features in claims.

In the drawings: Figure 1 is a front view of a double-decker ferry landing, constructed in accordance with my invention. Fig. 2 is a view in central longitudinal section therethrough, showing also in side elevation a ferryboat in coöperative engagement therewith. Fig. 3 is a top view of the operating mechanism. Fig. 4 is a diagrammatic view showing the relative movements of the main bridge and the upper gangways. Figs. 5, 6, 7, and 8 are detail views in sectional elevation of various forms of operating mechanism and safety devices also constructed in accordance with my invention, but constituting modifications of the mechanisms shown in Figs. 1, 2, and 3.

Referring first to Figs. 1, 2, and 3,—10 designates the main ferry bridge and 11 the upper gangways, the ferry bridge and gangways being arranged to register respectively with the lower and upper decks 12 and 13 of the ferryboats 14. Both the main ferry bridge and the upper gangways are arranged to swing upon suitable supports in the ferry house, the gangways 11 being shown as pivoted at 15 at their rear ends to an overhead structure 16, while the main bridge is provided at the rear end thereof with a rocking support 17 which may be of the usual or any desired character. The gangways 11 are provided with the usual swinging apron 18 at the front end thereof by which communication is established between the upper deck of the ferryboat and the said gangways. The main operating shaft 19, for determining the position of the main bridge, is suitably journaled in a gallows frame 20, the said operating shaft being provided with winding drums 21 for receiving the upper ends of chains 65, wire ropes, or the like, the lower ends of which are connected to the main bridge at points 22 near the forward end thereof; and the said shaft is also provided with drums 23 for receiving cords or chains 24, to the lower end of which are attached counterbalancing weights 25. By proper manipulation of the shaft 19 the main bridge 10 may be raised and lowered at will. This manipulation may be brought about by any suitable means,—as by power applied directly or indirectly thereto, a conventional illustration of an electric motor, in geared relation with the shaft 19, being shown at 66 in Fig. 3, for this purpose, or where a floating pontoon 26 is employed to support the forward end of the main bridge, as is common, the shaft may, if desired, be operated in one direction by the weights 25 when the bridge is lifted by the rising of the tide, and in the other direction by the weight of the bridge when the bridge falls owing to a falling of the tide. The shaft 19 is also provided with two sets of drums 27 for receiving chains or cords 28 which lead over direction pulleys 29 to the forward ends of the gangways 11, being connected thereto at points 30. By this means rotational movements of the shaft 19, corresponding to upward or downward movements of the main bridge 10, will cause the gangways 11 to be simultaneously moved in the same direction.

Because of the swinging aprons with which the upper gangways are provided and of the fact that the total length of the upper gangways is very much shorter than the total length of the main bridge, the relation of the suspension points 30 and 22 of the upper gangways and the main bridge respectively differ with respect to the rocking centers 15 and 17 and the points of connection with the upper and lower decks 13 and 12 of the boats 14, with the result that in order to uniformly raise and lower the extremities of the upper gangways and aprons and the main bridge, a variable movement must be given to the points of suspension, this variation being commonly in the ferry houses in use to-day about as 8 is to 11,—that is to say, the point of suspension 30 must move vertically through 8 units while the point of suspension 22 moves vertically through a distance of 11 units. To compensate for this I have proportioned the diameters of the drums 27 and 21 correspondingly, the drums 21 which are connected by the chains 65 to the main bridge being of larger diameter than are the drums 27 which are connected by the chains 28 with the upper gangways. By properly proportioning these drums I am enabled to exactly proportion the raising and lowering of the upper gangways and the main bridge to correctly position the extremities thereof at varying heights. The diagrammatic view Fig. 4 illustrates clearly the proportionate movements of the upper gangways and the main bridge for different levels of the ferryboat.

It will, of course, be understood that various modifications of this operating mechanism may be resorted to within the scope of my invention, and one such modification I have illustrated in Fig. 5 in which the main bridge 10 is lifted by means of a lifting screw 31 which is connected to a link, chain, or the like 32 which takes the place of the connecting element 65 in the example shown in Figs. 1, 2, and 3, the lifting screw being engaged by a nut 33 carried by a worm wheel 34 which is in turn operated by a worm 35 upon a shaft 36 in geared relation with an electric motor 66. The said lifting screw 31 is shown as provided with a counterbalancing means 67. The said counterbalancing means and the details of the operating means for the screw are not claimed specifically herein but form the subject matter of Letters Patent No. 960,701 granted to me on the 7th day of June, 1910, and to which reference is made for a fuller description. The shaft 36 is also provided with a worm 37 which engages a worm wheel 38 upon a cross shaft 39 the said shaft 39 being provided with a worm 40 which engages a worm wheel 41 upon a shaft 42 which carries drums 43 arranged to engage chains 44 connected to the upper gangways 11. In this arrangement the gearing is, of course, so proportioned as to impart the proper proportionate movement between the upper gangways and the main bridge.

Because of the fact that the upper gangways are arranged at some considerable height from the main deck and main landing bridge, and of the fact that the upper gangways are, in the construction here shown, entirely supported by the suspension devices,—taking no support from the upper deck of the ferryboat owing to the swinging apron connection,—it follows that any failure of the suspension means might result in a serious accident, and to obviate this I have provided a second set of suspension means which is adapted to come into play should any accident happen to the first set. In the construction shown in Figs. 1, 2, and 3, I have shown a secondary shaft 45 provided with drums 46 for receiving secondary chains 47 which are connected at their lower ends at the points 48 to the upper gangways 11, and for operating the shaft 45 I have provided a worm and worm wheel 49, the worm being provided with a sprocket wheel 50 having a dependent endless chain 51 which may be readily reached and operated by an attendant. In practice this chain should be operated by hand to take up the excess "slack" in the chain 47 as the gangway is raised by the main operating means and to free the connecting chain 47 to permit the main operating mechanism to work to lower the bridge; or if preferred the attendant may normally raise and lower the gangways by the employment of this hand operated device, in advance of the movement of the main operating means, the excess slack of the main chains 28 being constantly taken up by the said main operating means, as it operates. Drums 52, carrying chains or ropes 53 provided with counterweights 54 may be conveniently provided upon the shaft 45 to counterbalance the weight of the gangways 11 so that under the latter method of operation, a minimum of work will be imposed upon the attendant.

In Fig. 5 I have shown a modified form of safety device in which a duplicate raising and lowering mechanism is provided, to be operated by the main operating means. This mechanism comprises a second worm 55 upon the shaft 39, corresponding to the worm 40; a second shaft 56, corresponding to the shaft 42; a second worm wheel 57 upon the shaft 56, corresponding to the worm wheel 41 upon the shaft 42; a second set of drums 58 upon the shaft 56, corresponding to the drums 43; and a second set of chains 59 connecting the drums 58 to the gangway 11, corresponding to the chains 44. The chains 59 are preferably kept slightly slack under normal conditions so that the wear all comes on the first set of chains and operating mechanism therefor. By this means the safety devices are maintained in a substantially unworn condition ready for immediate operation should the first set break. The slack should be only slight so that they will come into operation with a minimum movement of the gangways should the first set fail.

In Fig. 6 the chains 28, instead of being wound around drums 27 upon the main shaft, are caused to pass over sprocket wheels 60 of suitable diameter thereon, being held in proper engagement therewith by weights 61. The weights 61 serve in this instance also to counterbalance the weight of the gangways. The safety or secondary chains 47, wound around drums 46 upon the shaft 45, may be employed, as in the construction shown in Figs. 1, 2, and 3.

In Fig. 7 I have shown the shaft 45 as driven from the shaft 19 by a sprocket and chain connection 62, the speed of drive being properly proportioned to give the required speed of movement of the chains 47 with respect to the chains 24, approximately similar of course to the speed of movement of the chains 28.

The example of my invention illustrated in Figs. 5, 6, and 7 are similar, in that they are each provided with two sets of operating means, independently driven from the main driving shaft 19, for raising and lowering the gang planks, whereby if any accident happens to one set the other set will come into play. The chains of one set in each of the constructions of Figs. 6 and 7 may be left slightly slack as described in connection with the modification shown in Fig. 5, and for the same purpose.

In Fig. 8 I have shown a construction wherein the ordinary safety chains 63 are employed, the chains being made in two parts, one of which is provided with a hook 64 which may be connected and disconnected by hand, with or from different links of the other part, as the gang planks ascend and descend. This form is similar to the form shown in Figs. 1, 2, and 3, in that it provides a means operated from the main shaft 19 for raising and lowering the gang planks at the proper proportionate speed with respect to the movements of the main bridge, and manually operated safety means, but differs therefrom in that while the safety chain device in Figs. 1, 2, and 3 may be actually used to raise and lower the gang planks, the device of Fig. 8 can only be used as a purely safety device to catch and hold the gang planks should an accident happen to the operating means. In this connection it may be noted that while I have referred to the chains 28 and 44, and their operating mechanism, throughout the specification, as the main operating means for the gang planks, and the chains 47 and 59 with their operating means, as the secondary or safety means, such expressions are purely arbitrary and are employed only for the purposes of clarifying the description; obviously either of the mechanisms may in each case be termed, and indeed be employed as, the main operating mechanism, and the other as the secondary or safety means.

While I have described my invention throughout the specification, and illustrated it in the drawings, as applied to ferry landings, it will, of course, be understood that it may equally be employed in connection with double-decked transfer-bridges generally, and that the term "ferry bridge" or "landing" is employed as broadly descriptive of this class of devices generally.

What I claim is:

1. In a landing the combination with a main bridge pivotally supported at one end about a horizontal axis, and an overhead suspension means therefor connected to the said bridge at the free end thereof, of an upper gangway also pivotally supported about a horizontal axis, an independent overhead suspension means for the said upper gangway connected thereto toward the free end thereof, and operating means for the two said suspension means for imparting predetermined proportionate movements thereto whereby the said main bridge and upper gangway will be moved simultaneously, but through different distances at the points of connection thereof with their respective suspension means.

2. In a landing the combination with a main bridge pivotally supported at one end about a horizontal axis, and an overhead suspension means therefor connected to the said bridge at the free end thereof, of an upper gangway also pivotally supported about a horizontal axis, an independent overhead suspension means for the said upper gangway connected thereto toward the free end thereof, and operating means for the two said suspension means for imparting predetermined proportionate movements thereto whereby the said main bridge and upper gangway will be moved simultaneously, but through different distances at the points of connection thereof with their respective suspension means, the said operating means including connected rotatable drums upon which the upper ends of the said suspension means are wound, the peripheral speed of the drums for the two said suspension means being different.

3. In a landing, the combination with a pivoted main bridge and a pivoted upper gangway, of separate suspension means therefor connected thereto at different relative points between their extremities, and operating means for raising and lowering the bridge and gangway through their said suspension means, including means for compensating for the varying movements required to cause the free extremities of the said bridge and gangway to maintain their proper relative distance apart.

4. In a landing the combination with a main bridge pivotally supported at one end about a horizontal axis, and an overhead suspension means therefor connected to the said bridge toward the free end thereof, of an upper gangway also pivotally supported about a horizontal axis, an independent overhead suspension means for the said upper gangway connected thereto toward the free end thereof, a common overhead operating shaft for the simultaneous operation of the two said suspension means, and means between the said shaft and the two said suspension means, whereby the suspension means for the main bridge is operated faster than that of the upper gangway.

5. In a landing, the combination with a main bridge, an upper gangway, a gallows frame, and means for suspensively and independently supporting the main bridge and the upper bridge from the gallows frame, of means included in the suspensive connections for causing the bridge and gangway to move different distances at their points of support.

6. In a landing, the combination with a main bridge, a suspension means therefor, and a main bridge shaft for operating the said suspension means, of an upper gangway, a suspension means therefor, a gangway shaft for operating the said suspension means, and a connection between the said main bridge shaft and said gangway shaft causing the two said suspension means to be operated at different speeds.

7. In a landing, the combination with a pivoted main bridge, a pivoted upper gangway, and a main operating shaft, of a drum on the main operating shaft, a flexible connection therefrom to the main bridge, a counterbalancing weight connected with the shaft tending to rotate the said shaft in a direction opposite to that in which it is operated when the main bridge falls, another drum on the main shaft, and a flexible connection therefrom to the upper gangway, the latter said drum being of a smaller diameter than the first said drum, the two said flexible connections being connected to the main bridge and upper gangway respectively at different relative points between their extremities.

In witness whereof I have hereunto set my hand this 15th day of September, 1909.

ARTHUR T. PRESCOTT.

Witnesses:
D. E. DEUTSCH,
HORATIO O'KEEFE.